United States Patent
Xu

(10) Patent No.: US 11,962,442 B2
(45) Date of Patent: Apr. 16, 2024

(54) PHASE SHIFT KEYING MODULATION AND DEMODULATION METHODS AND DEVICES

(71) Applicant: Nanjing Zgmicro Company Limited, Jiangsu (CN)

(72) Inventor: Bin Xu, Nanjing (CN)

(73) Assignee: Nanjing Zgmicro Company Limited, Jiangsu (CN)

( * ) Notice: Subject to any disclaimer, the term of this patent is extended or adjusted under 35 U.S.C. 154(b) by 98 days.

(21) Appl. No.: 17/865,391

(22) Filed: Jul. 15, 2022

(65) Prior Publication Data

US 2022/0360480 A1     Nov. 10, 2022

Related U.S. Application Data

(63) Continuation of application No. PCT/CN2020/140069, filed on Dec. 28, 2020.

(51) Int. Cl.
*H04L 27/20*     (2006.01)
*H04L 27/22*     (2006.01)

(52) U.S. Cl.
CPC .............. *H04L 27/20* (2013.01); *H04L 27/22* (2013.01)

(58) Field of Classification Search
CPC .......... H04B 1/04; H04B 1/16; H04B 1/7093; H04B 7/26; H04B 17/309; H04L 1/00; H04L 25/49; H04L 27/00; H04L 27/10; H04L 27/18; H04L 27/20; H04L 27/22; H04L 27/34; H04L 27/36; H04L 27/38; H04L 27/227; H04L 27/233; H04W 24/10; H04W 88/02
USPC ....... 375/130, 219, 274, 279, 295, 308, 330, 375/340
See application file for complete search history.

(56) References Cited

U.S. PATENT DOCUMENTS

| | | | |
|---|---|---|---|
| 10,965,507 B1 * | 3/2021 | Steele | H04L 27/2669 |
| 2011/0051783 A1 * | 3/2011 | Cahn | H04L 23/02 375/302 |
| 2013/0279548 A1 * | 10/2013 | Amanullah | H04L 27/2078 375/330 |

\* cited by examiner

*Primary Examiner* — Shawkat M Ali
(74) *Attorney, Agent, or Firm* — Joe Zheng

(57) ABSTRACT

The present invention provides a phase shift keying modulation method and a corresponding modulator, a phase shift keying demodulation method and a corresponding demodulator. The phase shift keying modulation method comprises: mapping a binary data stream to be modulated into a phase sequence comprising one or more phase symbols according to a predetermined phase shift keying modulation mode; modulating the phase symbol with a preset phase function to obtain a phase signal that changes continuously with time, wherein in each symbol cycle, a difference between a value of the phase signal at a beginning of the symbol cycle and a value of the phase signal at an end of the symbol cycle is equal to the phase symbol modulated in the symbol cycle; and obtaining a radio frequency signal by modulation based on the phase signal.

16 Claims, 2 Drawing Sheets

| preamble symbol | synchronization word | packet header | data payload |

PHASE SHIFT KEYING MODULATION AND DEMODULATION METHODS AND DEVICES

CROSS-REFERENCE OF RELATED APPLICATIONS

The present invention is a continuation of PCT/CN2020/140069 filed Dec. 28, 2020, which claims the priority of Chinese Patent Application No. 202010054013.2 filed Jan. 17, 2020, the entire contents of which are incorporated herein by reference.

BACKGROUND OF THE INVENTION

Field of the Invention

The present invention relates to the field of wireless communication, and more particularly, to a phase shift keying modulation method, a phase shift keying modulator, a phase shift keying demodulation method and a phase shift keying demodulator.

Description of the Related Art

The Internet of Things (IoT) is the foundation of the intelligent era, and wireless connection technology is the core of the Internet of Things. With the development of the Internet of Things, various wireless connection technologies can be used, such as Classic Bluetooth and Bluetooth Low Energy (BLE). Especially in a large number of sensor and control applications, people can come forward with higher and higher requirements on the power consumption, cost and performance of wireless connection technologies. Compared with Classic Bluetooth EDR2 DQPSK modulation technology, the biggest advantage of BLE 2M GFSK modulation technology is that GFSK is a constant envelope modulation technology. RF transmitters with constant envelope modulation have lower complexity and higher power efficiency. However, compared with the Classic Bluetooth EDR2 DQPSK modulation, the BLE 2M GFSK modulation has low bandwidth efficiency and poor anti-multipath ISI (inter symbol interference) performance. Classical phase shift keying modulation techniques, such as DQPSK, have large fluctuations in signal amplitude or large peak to average power ratio after the signal passes through a filter with limited bandwidth due to phase mutation. The signal with high peak to average power ratio requires high linearity of the power amplifier, resulting in more implementation complexity and low power efficiency.

Therefore, it is necessary to propose an improved techniques to solve the above problems among others.

SUMMARY OF THE INVENTION

The present invention discloses a phase shift keying modulation method, which avoids phase mutation and reduces an out-of-band spectrum by continuously changing phase, and improves spectrum efficiency while maintaining characteristics of constant envelope modulation with low complexity and high power amplification efficiency.

To achieve the purpose, according to one aspect of the present invention, a phase shift keying modulation method is provided. The phase shift keying modulation method comprises: mapping a binary data stream $\{b_n\}$ into a phase sequence $\{\theta_k\}$ comprising one or more phase symbols, modulating the phase symbols in the phase sequence into a continuous phase signal $\varphi(t)$ through a phase function according to an equation $\varphi(t)=\Sigma_{k=0}^{K-1}\theta_k*p(t-k*T)$, and obtaining a radio frequency signal based on the phase signal, wherein n=0, 1, 2, 3, ... N−1, k=0, 1, 2, ..., K−1, N and K are positive integers, p(t) is the phase function, and $p(t\leq 0)=0$, $p(t\geq T)=1$, a value of $p(0\leq t\leq T)$ changes continuously between 0 and 1, and T is a symbol cycle.

According to another aspect of the present invention, a phase shift keying modulation method is provided. The A phase shift keying modulation method comprises: mapping a binary data stream to be modulated into a phase sequence comprising one or more phase symbols according to a predetermined phase shift keying modulation mode; modulating the phase symbol with a preset phase function to obtain a phase signal that changes continuously with time, wherein in each symbol cycle, a difference between a value of the phase signal at a beginning of the symbol cycle and a value of the phase signal at an end of the symbol cycle is equal to the phase symbol modulated in the symbol cycle; and obtaining a radio frequency signal by modulation based on the phase signal.

According to still another aspect of the present invention, a phase shift keying demodulation method for demodulating a signal modulated by the phase shift keying modulation method above mentioned is provided. The phase shift keying demodulation method comprises: down-converting a received RF signal into a baseband signal, performing frequency and time synchronization and sampling on the baseband signal to obtain a baseband sampling signal; obtaining a differential signal based on the baseband sampling signal, and obtaining a binary data by demodulation according to the differential signal.

In the present invention, the phase shift keying modulation method avoids the phase mutation and reduces the out-of-band spectrum by continuously changing the phase, and improves spectrum efficiency while maintaining the characteristics of constant envelope modulation with low complexity and high power amplification efficiency.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

In wireless signal modulation, RF (radio frequency) transmitters using a constant envelope modulation technique, such as BLE 2M GFSK, has lower complexity in design and higher efficiency in power consumption. However, there are problems such as low modulation bandwidth efficiency and poor anti-multipath ISI (inter symbol interference) performance. In addition, a classical phase shift keying modulation technology (such as DQPSK) has more fluctuation in signal amplitude or large peak to average power ratio after signal passes through a filter with limited bandwidth due to phase mutation. The signal with high peak to average power ratio requires high linearity of power amplifier, resulting in high implementation complexity and low power efficiency.

To solve this problem, the present invention combines characteristics of the phase shift keying (PSK) modulation and the constant envelope modulation, avoids the phase mutation and reduces out-of-band spectrum by continuously changing the phase, and improves spectrum efficiency while maintaining characteristics of constant envelope modulation with low complexity and high power amplification efficiency. A phase shift keying modulation method provided in the present invention is based on an idea of constant envelope and continuous phase (CECP) phase shift keying (PSK) modulation.

Figures 1, 2:
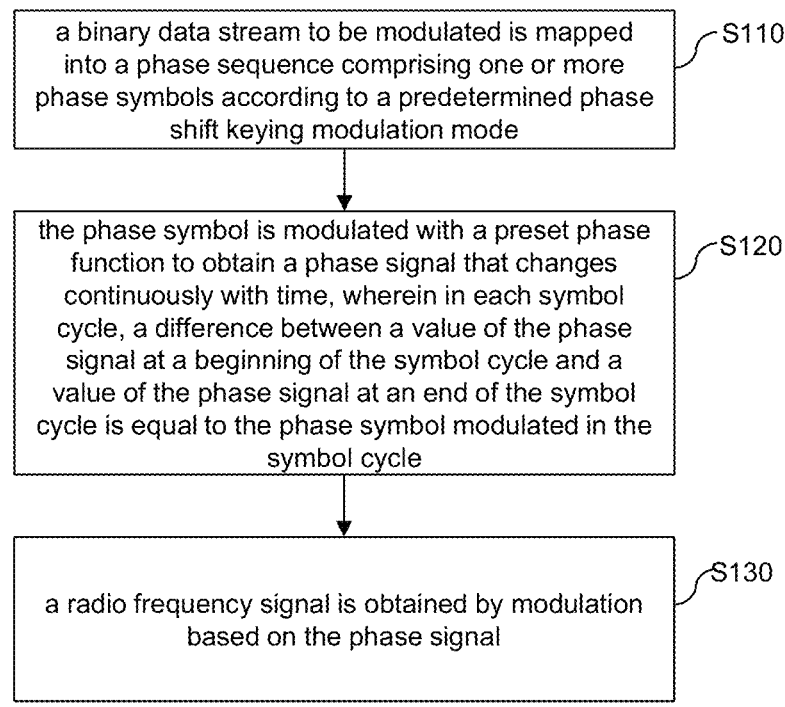
FIG. 1 is a flowchart of a phase shift keying modulation method provided according to one embodiment of the present invention.
FIG. 2 is a data packet structure diagram in a first embodiment of the present invention.

FIG. 1 is a flowchart of a phase shift keying modulation method provided according to one embodiment of the present invention. As shown in FIG. 1, the phase shift keying modulation method comprises following operations. At S110, a binary data stream to be modulated is mapped into a phase sequence comprising one or more phase symbols according to a mapping relationship between the binary data stream and the phase sequence in a predetermined phase shift keying modulation mode. At S120, the phase symbol is modulated with a preset phase function to obtain a phase signal that changes continuously with time, wherein in each symbol cycle, a difference between a value of the phase signal at a beginning of the symbol cycle and a value of the phase signal at an end of the symbol cycle is equal to the phase symbol modulated in the symbol cycle.

At S130, a radio frequency signal is obtained by modulation based on the phase signal. In one embodiment, the phase function $p(t)$ is a continuous function, $p(t \leq 0) = 0$, $p(t \geq T) = 1$, a value of $p(0 \leq t \leq T)$ changes continuously between 0 and 1, t is a time variable and T is a symbol cycle. In another embodiment, the binary data stream $\{b_n\}$ is mapped into the phase sequence $\{\theta_k\}$ comprising one or more phase symbols $\theta$, wherein $n=0, 1, 2, 3, \ldots N-1$, $k=0, 1, 2, \ldots, K-1$, N and K are positive integers.

In one embodiment, for M-level phase shift keying modulation, let $K=N/\log_2(M)$, wherein M is 2, 4 or 8. When M=2, the modulation is a binary phase shift keying (BPSK) modulation. When M=4, the modulation is a quadrature phase shift keying (QPSK) modulation. When M=8, the modulation is an 8-ary phase shift keying (8PSK) modulation. The predetermined phase shift keying modulation mode comprises one or more of $\pi/2$ BPSK modulation, $\pi/4$ QPSK modulation and $\pi/8$ 8PSK modulation. Different phase shift keying modulation modes may have different mapping relationships. Three mapping relationships of the three PSK modulation modes are shown in Tab.1, Tab.2, and Tab.3 respectively.

The modulation method at a transmitting side according to one embodiment of the present invention is introduced as following. The phase signal $\varphi(t)$ is obtained according to:

$$\varphi(t) = \Sigma_{k=0}^{K-1} \theta_k * p(t - k*T) \tag{EQ.01}$$

wherein T is a symbol cycle, the phase sequence $\{\theta_k\}$ is digital phases that needs to be transmitted in digital communication, and a plurality of digital phases are modulated into the continuous phase signal $\varphi(t)$ through the phase function $p(t)$.

Unlike the classical phase shift keying modulation, a change of the phase signal $\varphi(t)$ is slow and continuous. It can be seen from the above equation EQ.01 that the change progress of the phase signal $\varphi(t)$ can be set according to the symbol cycle T, so as to avoid the problem that the out-of-band spectrum of the signal becomes higher after the phase mutation in the traditional method, which needs to be filtered by a filter, but the amplitude of the filtered signal has great fluctuations.

A baseband signal $v(t)$ is modulated according to:

$$v(t) = A * e^{j*\varphi(t)} = A * \{\cos[\varphi(t)] + j*\sin[\varphi(t)]\} \tag{EQ.02}$$

wherein A is a signal amplitude, and the continuous phase signal $\varphi(t)$ is modulated into the analog baseband signal according to the equation (EQ.02). Then, a radio frequency signal $S(t)$ is modulated according to:

$$S(t) = \text{Re}[v(t) * e^{j*2\pi*F_c*t}] \tag{EQ.03}$$

wherein $F_c$ is a frequency of a radio frequency carrier, and Re[ ] is a symbol for taking a real part, and the analog baseband signal $v(t)$ modulated by the continuous phase signal $\varphi(t)$ is modulated on the radio frequency carrier for easy transmission.

At a receiving side, a method for demodulating the signal modulated by the above modulation method comprises: down-converting a received RF signal into a baseband signal; performing frequency and time synchronization and sampling on the baseband signal to obtain a baseband sampling signal; obtaining a differential signal based on the baseband sampling signal; and obtaining a binary data by demodulation according to the differential signal.

In one embodiment, the demodulating method comprises following operations. The first operation is to down-convert the RF signal to the baseband signal according to:

$$\tilde{v}(t) = \tilde{A}(t) * e^{j*[\varphi(t) + 2\pi*\Delta f(t) + \varepsilon(t)]} + n(t) \tag{EQ.04}$$

wherein $\tilde{v}(t)$ is the baseband signal, $\tilde{A}$ is an amplitude of the received RF signal, $n(t)$ is an additive noise, $\Delta f(t)$ is a residual frequency deviation, and $\varepsilon(t)$ is a phase noise.

The second operation is to perform frequency and time synchronization and sampling on the baseband signal obtained in the first operation to obtain the baseband sampling signal according to:

$$\tilde{v}(k*T) = \tilde{A}(k*T) * e^{j*[\varphi(k*T) + \varepsilon(k*T)]} + n(k*T) \tag{EQ.05}$$

wherein $\tilde{v}(k*T)$ is the baseband sampling signal, $\epsilon(k*T)$ is a phase error after frequency synchronization or calibration.

The third operation is to calculate a differential signal based on the baseband sampling signal obtained in the second operation according to:

$$\hat{u}_k = \tilde{v}((k+1)*T)*\tilde{v}^*(k*T) = \quad \text{(EQ. 06)}$$
$$\hat{A}_k * e^{j*[\varphi((k+1)*T)-\varphi(k*T)+\epsilon_k]} + \hat{n}_k = \hat{A}_k * e^{j*[\theta_k+\epsilon_k]} + \hat{n}_k$$

wherein $\hat{A}_k = \tilde{A}((k+1)*T)*\tilde{A}(k*T)$, $\theta_k = \varphi((k+1)*T) - \varphi(k*T)$, $\epsilon_k = \epsilon((k+1)*T) - \epsilon(k*T)$, $\hat{n}_k = \tilde{A}((k+1)*T)*e^{j*[\varphi((k+1)*T)+\epsilon((k+1)*T)]} * n^*(k*T) +$ $n((k+1)*T)*\tilde{A}(k*T)*e^{-j*[\varphi(k*T)+\epsilon(k*T)]} + n((k+1)*T)*n^*(k*T)$, where ( )* is a complex conjugate operation.

The fourth operation is to calculate phase $\hat{\theta}_k$ of the differential signal according to:

$$\hat{\theta}_k = \text{angle } \{\hat{u}_k\} \quad \text{(EQ. 07)}$$
$$= \text{angle } \{\hat{A}_k * e^{j*[\theta_k+\epsilon_k]} + \hat{n}_k\}$$
$$= \theta_k + \gamma_k$$

wherein, $\gamma_k$ is a phase estimation error, angle { } is an operation to take angle or phase. The fifth operation is to obtain the mapped binary data according to the phase $\hat{\theta}_k$ obtained in the fourth operation.

The First Embodiment

In the first embodiment, the phase function of CECP PSK modulation is defined as follows:

$$p(t) = \begin{cases} 0 & t \leq 0 \\ [1+\sin(\pi*t/T-\pi/2)]/2 & 0 \leq t \leq T \\ 1 & t \geq T \end{cases} \quad \text{(EQ. 08)}$$

where T is the symbol cycle.

In the first embodiment, M of CECP PSK modulation is 2, 4, and 8, which correspond to π/2 BPSK modulation, π/4 QPSK modulation, and π/8 8PSK modulation respectively. Mapping relationships between the binary data stream $\{b_n\}$ and the phase sequence $\{\theta_k\}$ in the π/2 BPSK modulation, the π/4 QPSK modulation, and the π/8 8PSK modulation are shown in Tab.1, Tab.2, and Tab.3 respectively.

TABLE 1

π/2 BPSK mapping table

| $b_k$ | $\theta_k$ |
|---|---|
| 0 | +π/2 |
| 1 | −π/2 |

TABLE 2

π/4 QPSK mapping table

| $b_{2k}$ | $b_{2k+1}$ | $\theta_k$ |
|---|---|---|
| 0 | 0 | +π/4 |
| 0 | 1 | +3π/4 |
| 1 | 1 | −3π/4 |
| 1 | 0 | −π/4 |

TABLE 3

π/8 8PSK mapping table

| $b_{3k}$ | $b_{3k+1}$ | $b_{3k+2}$ | $\theta_k$ |
|---|---|---|---|
| 0 | 0 | 0 | +π/8 |
| 0 | 0 | 1 | +3π/8 |
| 0 | 1 | 1 | +5π/8 |
| 0 | 1 | 0 | +7π/8 |
| 1 | 1 | 0 | −7π/8 |
| 1 | 1 | 1 | −5π/8 |
| 1 | 0 | 1 | −3π/8 |
| 1 | 0 | 0 | −π/8 |

In the first embodiment, a data packet used in the CECP PSK modulation method of the present invention is shown in FIG. 2. As shown in the FIG. 2, the data packet comprises a preamble symbol, a synchronization word, a packet header, and a data payload. In some embodiments of the present invention, the preamble, the synchronization word, and the packet header are modulated by the π/2 BPSK modulation, and the data payload is modulated by the π/2 BPSK modulation, the π/4 QPSK modulation, or the π/8 8PSK modulation.

The preamble symbol is configured for automatic gain control (AGC), frequency and symbol time synchronization. The synchronization word is configured for packet synchronization or connection identification. The packet header comprises a modulation format of the data payload, a length of the data payload, a coding rate, and a sequence number (SEQN) and an automatic retransmission request (ARQ) and other control information. In the first embodiment, a length of the preamble symbol is 8 symbols, a length of the synchronization word is 32 symbols, and a length of the packet header is 16 symbols. The symbol cycle T is 1 us. If a first bit of the synchronization word is 0, and the preamble symbol is 0 1 0 1 0 1 0 1. If the first bit of the synchronization word is 1, and the preamble symbol is 1 0 1 0 1 0 1 0.

Figure 3:
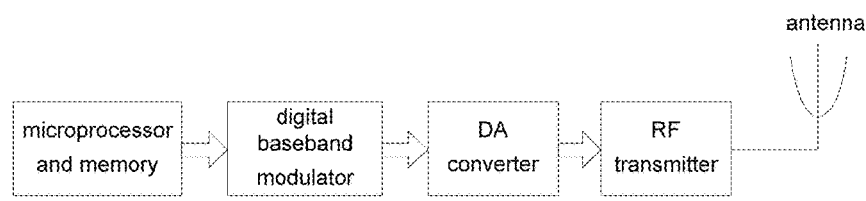
FIG. 3 is a structure diagram of a transmitting device performing the phase shift keying modulation method according to one embodiment of the present invention.

In the first embodiment, a transmitting device using the phase shift keying modulation method of the present invention is shown in FIG. 3. The transmitting device comprises a microprocessor and memory, a digital baseband modulator, a digital-to-analog (DA) converter, a radio frequency (RF) transmitter and an antenna. The microprocessors and memory are configured to store and execute programs, process communication protocols, configure and control the digital baseband modulator and the RF transmitter, for example, prepare and send data to the digital baseband processor, configure the synchronization word and the modulation format, configure RF transmission channel and power, etc. The digital baseband modulator first performs encryption, cyclic redundancy check (CRC), whitening, channel coding and other processing on the binary data stream, maps the processed binary data stream into the phase sequence according to the mapping table of Tab.1-Tab.3, and then modulates the phase sequence to an oversampling digital phase according to EQ.08 and EQ.01. An oversampling rate of the oversampling digital phase signal is 32 times, that is, 32 Msps. Then, oversampling I/Q digital signals corresponding to A*cos[φ(t)] and A*sin[φ(t)] respectively are generated according to EQ.02, and each digital signal is quantized to 8 bits. Then, the 32Msps I/Q digital signals are sent to the DA converter to be converted into the analog baseband signal, which be sent to the RF transmitter for processing. The RF transmitter first low-pass filters and amplifies the analog baseband signal, and then mixes the processed analog baseband signal with a 2.4 GHz RF carrier to form the radio frequency signal. After the radio frequency signal is amplified by the power amplifier, it is sent through the antenna. It can be seen that the RF transmitter in the first embodiment adopts a typical I/Q quadrature modulation structure.

Figure 4:
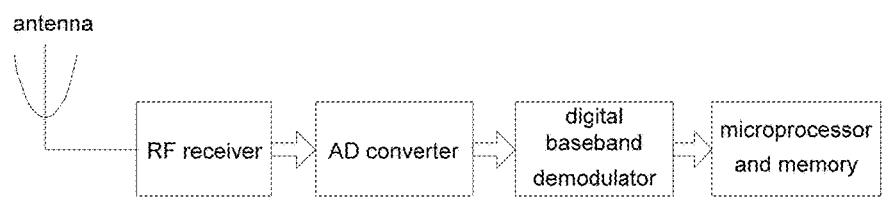
FIG. 4 is a structure diagram of a receiving device performing the phase shift keying demodulation method according to one embodiment of the present invention.

In the first embodiment, a receiving device using the phase shift keying demodulation method of the present invention is shown in FIG. 4. The receiving device comprises an antenna, a RF (radio frequency) receiver, an AD (analog-to-digital) converter, a digital baseband demodulator, a microprocessor and memory. The microprocessor and memory are configured to store and execute programs, configure and control the digital baseband demodulator and the RF receiver, for example, configure an RF receiving channel and a preset synchronization word, receive and process an output data of the digital baseband demodulator, and execute a communication protocol to process the output data. After the microprocessor configures the RF receiving channel and a receiving time, a radio frequency signal received by the antenna is amplified, down-converted by the RF receiver to a low IF (intermediate frequency) or baseband analog signal. After filtering and other processing, the low IF or baseband analog signal is sent to the AD converter for conversion to get the low IF or baseband digital signal. Then, the digital signal is sent to the digital baseband demodulator. The digital baseband demodulator first detects the preamble symbol shown in FIG. 2, performs AGC, frequency synchronization and symbol time synchronization according to the preamble symbol, and then demodulates and matches the synchronization word. If the demodulated synchronization word matches a local preset synchronization word, the packet header is demodulated. Then, the data payload is demodulated according to the modulation format, the length of the data payload, the coding rate and other parameters in the packet header. The process of demodulating the data payload comprises recovering an estimated value of the transmitted binary data according to the mapping tables Tab.1-Tab.3 and the EQ.08, channel decoding, dewhitening, CRC detection, and decryption. Finally, the binary data that passes the CRC detection or status information that the CRC detection fails is sent to the microprocessor for further processing.

Second Embodiment

In addition to the I/Q quadrature modulation (phase modulation) in the first embodiment, in the second embodiment, the transmitting device implements the modulation idea of the present invention by using a frequency modulation method. The frequency modulation method may be a direct frequency modulation or a frequency two-point modulation (I/Q). Specifically, a derivative function of the phase signal φ(t) obtained according to EQ.01 is calculated, namely:

$$f(t)=d\varphi(t)/dt \quad (EQ.09)$$

The derivative function is a frequency function, and the baseband signal is modulated by using the frequency modulation method based on the frequency function $f(t)$. The transmitting device using the frequency direct modulation or frequency two-point modulation is shown in FIG. 3. The transmitting device comprises a microprocessor and memory, a digital baseband modulator, a DA converter, a RF transmitter and an antenna. The microprocessors and memory are configured to store and execute programs, process communication protocols, configure and control the digital baseband modulator and the RF transmitter, for example, prepare and send data to the digital baseband processor, configure the synchronization word and the modulation format, configure RF transmission channel and power, etc. The digital baseband modulator first performs encryption, cyclic redundancy check (CRC), whitening, channel coding and other processing on the binary data stream, maps the processed binary data stream into the phase sequence according to the CECP PSK mapping table in one of Tab.1-Tab.3, and then modulates the phase sequence to an oversampling digital phase according to EQ.08 and EQ.01. An oversampling rate of the oversampling digital phase signal is 32 times, that is, 32Msps. Then, an oversampled digital frequency signal is generated according to EQ.09, and each digital frequency signal is quantized to 8 bits. The 32Msps digital frequency signal are sent to the DA converter to be converted into the analog baseband signal, which be sent to the RF transmitter for processing. The RF transmitter first low-pass filters and amplifies the analog baseband signal, and then sends the processed analog baseband signal to the two-point modulation phase-locked loop (PLL) and a voltage-controlled oscillator (VCO) to directly modulate the processed analog baseband signal with the 2.4 GHz RF carrier to form the RF signal. After the radio frequency signal is amplified by the power amplifier, it is sent through the antenna. The radio frequency transmitter in the second embodiment adopts a typical two-point direct modulation structure.

Third Embodiment

In the third embodiment, the differential signal obtained in the demodulation is expressed as $\hat{I}_k+\hat{Q}_k$, where components $\hat{I}_k$ and $\hat{Q}_k$ can be separated. Compared with the foregoing first embodiment, the demodulation method of the third embodiment is simpler and has better performance.

Specifically, the binary data is obtained by demodulation based on a real part signal $\hat{I}_k$ and an imaginary part signal $\hat{Q}_k$ contained in the differential signal $\hat{u}_k$. In the third embodiment, as shown in FIG. 4, in the receiving device using the phase shift keying demodulation method of the present invention, the digital baseband demodulator recovers the transmitted binary data as follows. The EQ.06 is rewrote as:

$$\hat{u}_k=\hat{A}_k*\cos(\theta_k+\epsilon_k)+j*\hat{A}_k*\sin(\theta_k+\epsilon_k)+\hat{n}_k{}^I+j*\hat{n}_k{}^Q=\hat{I}_k+j*\hat{Q}_k \quad (EQ.10)$$

where $\hat{I}_k=\hat{A}_k*\cos(\theta_k+\epsilon_k)+\hat{n}_K{}^I$, $\hat{Q}_k=j*\hat{A}_k*\sin(\theta_k+\epsilon_k)+j*\hat{n}_k{}^Q, \hat{n}_k=\hat{n}_K{}^I+j*\hat{n}_k{}^Q$.

If the RF signal is modulated by the π/2 BPSK modulation, the estimated value $\hat{b}_k$ of the binary data $b_k$ is recovered according to:

$$\hat{b}_k = \begin{cases} 0, \hat{Q}_k \geq 0 \\ 1, \hat{Q}_k < 0 \end{cases};$$

If the RF signal is modulated by the π/4 QPSK modulation, the estimated values $\hat{b}_{2k}$ and $\hat{b}_{2k+1}$ of the binary data $b_{2k}$ and $b_{2k+1}$ are recovered according to:

$$\hat{b}_{2k} = \begin{cases} 0, \hat{Q}_k \geq 0 \\ 1, \hat{Q}_k < 0 \end{cases}; \text{and}$$

$$\hat{b}_{2k+1} = \begin{cases} 0, \hat{I}_k \geq 0 \\ 1, \hat{I}_k < 0 \end{cases};$$

If the RF signal is modulated by the π/8 8PSK modulation, the estimated values $\hat{b}_{3k}$, $\hat{b}_{3k+1}$ and $\hat{b}_{3k+2}$ of the binary data $b_{3k}$, $b_{3k+1}$ and $b_{3k+2}$ are recovered according to:

$$\hat{b}_{3k} = \begin{cases} 0, \hat{Q}_k \geq 0 \\ 1, \hat{Q}_k < 0 \end{cases};$$

$$\hat{b}_{3k+1} = \begin{cases} 0, \hat{I}_k \geq 0 \\ 1, \hat{I}_k < 0 \end{cases}; \text{and}$$

$$\hat{b}_{3k+2} = \begin{cases} 0, |\hat{I}_k| \geq |\hat{Q}_k| \\ 1, |\hat{I}_k| < |\hat{Q}_k| \end{cases},$$

wherein || is a symbol for taking the absolute value.

Fourth Embodiment

In the fourth embodiment, the phase shift keying modulation is performed using the following phase function:

$$p(t) = \begin{cases} 0 & t \leq 0 \\ t/T & 0 \leq t \leq T \\ 1 & t \geq T \end{cases} \quad \text{(EQ. 11)}$$

Fifth Embodiment

In the fifth embodiment, the phase shift keying modulation is performed using the following phase function:

$$p(t) = \begin{cases} 0 & t \leq 0 \\ t^2/T^2 & 0 \leq t \leq T \\ 1 & t \geq T \end{cases} \quad \text{(EQ. 12)}$$

The π/4 QPSK signal with a rate of 2 Mbps modulated by the phase shift keying modulation method of the present invention occupies a lower signal bandwidth and a longer symbol cycle compared to the signal modulated by the BLE 2M GFSK modulation. Therefore, it has better anti-multipath ISI performance.

Figure 5:
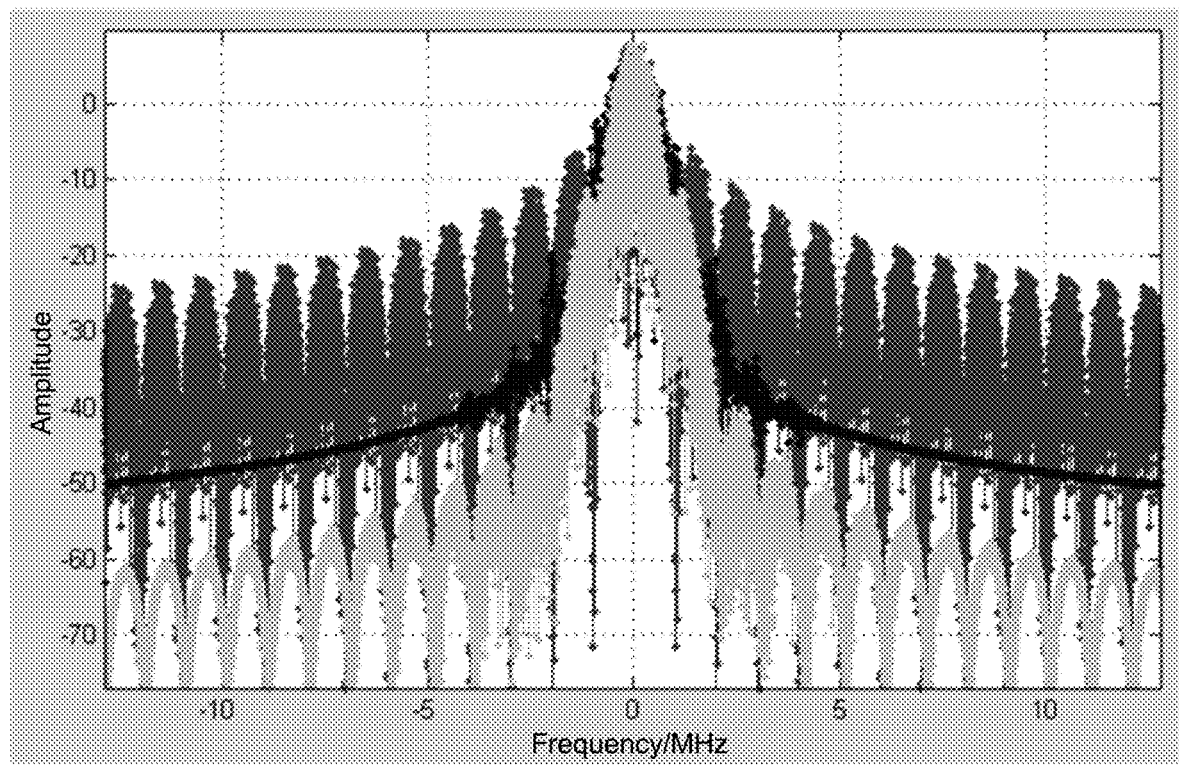
FIG. 5 is a spectrum effect comparison diagram of the phase keying modulation method of the present invention and the other phase keying modulation methods.

FIG. 5 is a spectrum effect comparison diagram of the modulation method of the present invention and other modulation methods. As shown in FIG. 5, assuming that the data transmission rates are the same, both are 2 Mbps, and the constant envelope signal are used, a light gray part in FIG. 5 is the spectrum of π/4 QPSK modulation signal modulated in the present invention, a black part in FIG. 5 is the spectrum of GFSK modulation signal with modulation index of 0.5 used by LE 2M, and a dark gray part in FIG. 5 is the spectrum of the constant envelope π/4 DQPSK modulation signal. It can be found from FIG. 5 that for the same data transmission rate, the spectrum occupied by the π/4 QPSK modulated signal of the present invention is less than that of GFSK modulation signal, and is far smaller than that of the constant envelope π/4 DQPSK modulated signal. In order to reduce the spectrum occupied by the π/4 DQPSK (for example, the π/4 DQPSK used by Bluetooth EDR2) modulated signal, the π/4 DQPSK modulated signal can be filtered, but the filtered π/4 DQPSK modulated signal is not a constant envelope signal. The symbol cycle of the π/4 QPSK modulated signal of the present invention is 1 us, while the symbol cycle of the LE 2M GFSK modulation is 0.5 us, and the π/4 QPSK modulated signal of the present invention is more resistant to multipath inter symbol interference than the LE 2M GFSK modulated signal.

It can be seen from the above embodiments that the phase shift keying modulation method avoids the phase mutation and reduces the out-of-band spectrum by continuously changing the phase, and improves spectrum efficiency while maintaining the characteristics of constant envelope modulation with low complexity and high power amplification efficiency.

Those skilled in the art should be aware that the embodiments of this application may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of this application.

Obviously, a person skilled in the art may make various changes and variations to the application without departing from the spirit and scope of the application. Thus, if these modifications and variations of this application fall within the scope of the claims and their equivalent technologies, the application is also intended to comprise these changes and variations.

I claim:

1. A phase shift keying modulation method, the method comprising:
   mapping a binary data stream $\{b_n\}$ into a phase sequence $\{\theta_k\}$, the phase sequence $\{\theta_k\}$ including one or more phase symbols, wherein n=0, 1, 2, 3, ... N−1, k=0, 1, 2, ... , K−1, N and K are positive integers;
   modulating the phase symbols in the phase sequence into a continuous phase signal φ(t) through a phase function according to: φ(t)=$\Sigma_{k=0}^{K-1}\theta_k$*p(t−k*T); and
   obtaining a radio frequency signal based on the continuous phase signal, wherein p(t) is the phase function, and p(t≤0)=0, p(t≥T)=1, a value of p(0≤t≤T) changes continuously between 0 and 1, t is a time variable and T is a symbol cycle.

2. The phase shift keying modulation method according to claim 1, wherein said obtaining the radio frequency signal based on the continuous phase signal comprises:
   obtaining a baseband signal based on the continuous phase signal; and
   obtaining the radio frequency signal based on the baseband signal, wherein the baseband signal v(t) is:

$v(t)=A*e^{j*\varphi(t)}=A*\{\cos[\varphi(t)]/j*\sin[\varphi(t)]\}$,

A is a signal amplitude, and j is an imaginary part symbol, the radio frequency signal S(t) is:

$S(t)=\text{Re}[v(t)*e^{j*2\pi**Fc*t}]$, and $F_c$ is a frequency of a radio frequency carrier, and Re[ ] is a symbol for taking a real part.

3. The phase shift keying modulation method according to claim 1, wherein a derivative of the phase function p(t) is a continuous function.

4. The phase shift keying modulation method according to claim 1, wherein the phase function is, $$p(t) = \begin{cases} 0 & t \leq 0 \\ [1+\sin(\pi*t/T - \pi/2)]/2 & 0 \leq t \leq T; \text{ or} \\ 1 & t \geq T \end{cases}$$

$$p(t) = \begin{cases} 0 & t \leq 0 \\ t/T & 0 \leq t \leq T; \text{ or}, \\ 1 & t \geq T \end{cases}$$

$$p(t) = \begin{cases} 0 & t \leq 0 \\ t^2/T^2 & 0 \leq t \leq T. \\ 1 & t \geq T \end{cases}$$

5. The phase shift keying modulation method according to claim 1, wherein the obtaining the radio frequency signal based on the continuous phase signal comprises:
   taking a derivative function of the continuous phase signal as a frequency function; and
   obtaining the radio frequency signal by utilizing a frequency modulation method based on the frequency function.

6. The phase shift keying modulation method according to claim 1, wherein the binary data stream $\{b_n\}$ is mapped into the phase sequence $\{\theta_k\}$ according to a mapping relationship corresponding to one or more modulation modes in a π/2 Binary Phase Shift Keying (BPSK) modulation, a π/4 Quadrature Phase Shift Keying (QPSK) modulation, and a π/8 8PSK modulation.

7. A phase shift keying modulation method, the method comprising:
   mapping a binary data stream to be modulated into a phase sequence, the phase sequence including one or more phase symbols according to a mapping relationship between the binary data stream and the phase sequence in a predetermined phase shift keying modulation mode;
   modulating the phase symbols with a preset phase function to obtain a phase signal that changes continuously with time, wherein in each symbol cycle, a difference between a value of the phase signal at a beginning of the symbol cycle and a value of the phase signal at an end of the symbol cycle is equal to the phase symbols modulated in the symbol cycle; and
   obtaining a radio frequency signal by modulation based on the phase signal.

8. The phase shift keying modulation method according to claim 7, wherein the phase function p(t) is a continuous function, p(t≤0)=0, p(t≥T)=1, a value of p(0≤t≤T) changes continuously between 0 and 1, t is a time variable and T is the symbol cycle.

9. The phase shift keying modulation method according to claim 8, wherein a derivative of the phase function p(t) is a continuous function.

10. The phase shift keying modulation method according to claim 8, wherein the phase signal φ(t) is:
    φ(t)=$\Sigma_{k=0}^{K-1}\theta_k$*p(t−k*T), wherein $\{\theta_k\}$ is a phase symbol, and the phase sequence is expressed as $\{\theta_k\}$, k=0, 1, 2, ... , K−1, K is a positive integer.

11. The phase shift keying modulation method according to claim 10, wherein for M-level phase shift keying modulation, K=N/log$_2$(M), wherein N is a positive into e r M is 2, 4 or 8, it is a binary phase shift keying modulation when M=2, it is a quadrature phase shift keying modulation when M=4, and it is an 8-ary phase shift keying modulation when M=8.

12. The phase shift keying modulation method according to claim 10, wherein the phase function is, $$p(t) = \begin{cases} 0 & t \leq 0 \\ [1+\sin(\pi*t/T - \pi/2)]/2 & 0 \leq t \leq T; \text{ or} \\ 1 & t \geq T \end{cases}$$

$$p(t) = \begin{cases} 0 & t \leq 0 \\ t/T & 0 \leq t \leq T; \text{ or}, \\ 1 & t \geq T \end{cases}$$

$$p(t) = \begin{cases} 0 & t \leq 0 \\ t^2/T^2 & 0 \leq t \leq T. \\ 1 & t \geq T \end{cases}$$

13. The phase shift keying modulation method according to claim 10, wherein the obtaining the radio frequency signal by modulation based on the phase signal comprises:
    modulating the phase signal into a baseband signal v(t); and
    modulating the baseband signal into the radio frequency signal at a predetermined radio frequency carrier frequency, wherein $v(t)=A*e^{j*\varphi(t)}=A*\{\cos[\varphi(t)]+j*\sin[\varphi(t)]\}$, and wherein A is a signal amplitude and j is an imaginary part symbol.

14. The phase shift keying modulation method according to claim 10, wherein the obtaining the radio frequency signal by modulation based on the phase signal comprises:

taking a derivative function of the phase signal as a frequency function; and obtaining the radio frequency signal by utilizing a frequency modulation method based on the frequency function.

15. The phase shift keying modulation method according to claim 7, wherein the predetermined phase shift keying modulation mode comprises one or more of $\pi/2$ Binary Phase Shift Keying (BPSK) modulation, $\pi/4$ Quadrature Phase Shift Keying (QPSK) modulation and $\pi/8$ 8PSK modulation.

16. A phase shift keying modulator method, the method comprising:

mapping a binary data stream $\{b_n\}$ into a phase sequence $\{\theta_k\}$, the phase sequence $\{\theta_k\}$ including one or more phase symbols;

modulating the phase symbols in the phase sequence into a continuous phase signal $\varphi(t)$ through a phase function according to: $\phi(t)=\Sigma_{k=0}^{K-1}\theta_k*p(t-k*T)$; and obtaining a radio frequency signal based on the continuous phase signal;

wherein n=0, 1, 2, 3, . . . N−1, k=0, 1, 2, . . . , K−1, N and K are positive integers, p(t) is the phase function, and $p(t\leq 0)=0$, $p(t\geq T)=1$, a value of $p(0\leq t\leq T)$ changes continuously between 0 and 1, t is time variable, and T is a symbol cycle.

\* \* \* \* \*